Sept. 25, 1956 A. G. HYLAND 2,764,267
ASSEMBLY OF DISSIMILAR METALS AND METHOD OF MANUFACTURE
Filed Aug. 30, 1952 2 Sheets-Sheet 1
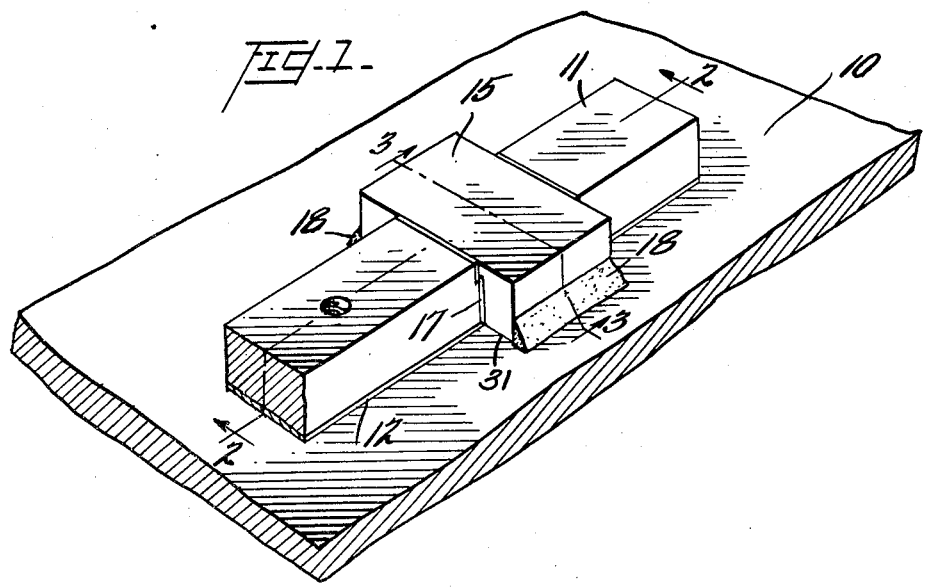
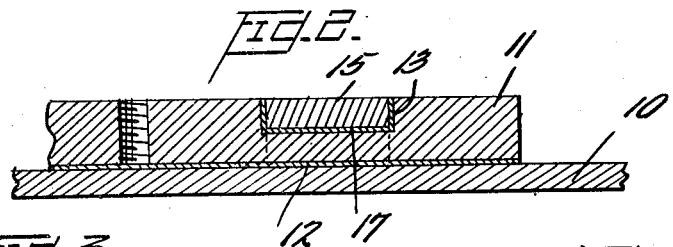
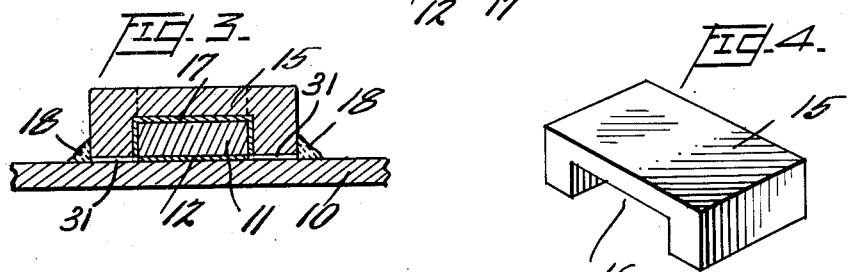
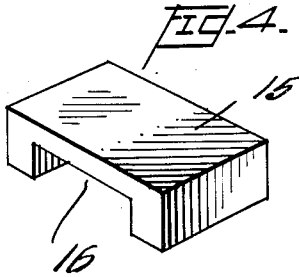
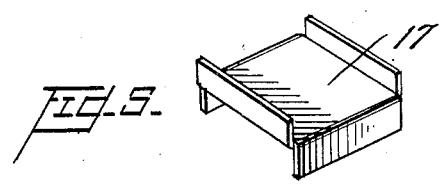
INVENTOR
Alexander G. Hyland,
BY C. B. Hamilton.
ATTORNEY Sept. 25, 1956 A. G. HYLAND 2,764,267
ASSEMBLY OF DISSIMILAR METALS AND METHOD OF MANUFACTURE
Filed Aug. 30, 1952 2 Sheets-Sheet 2
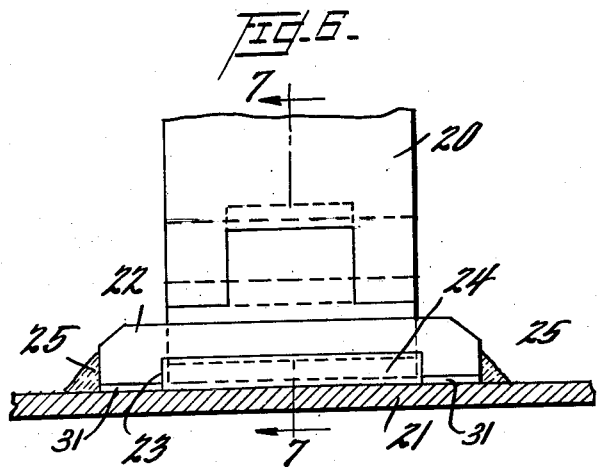
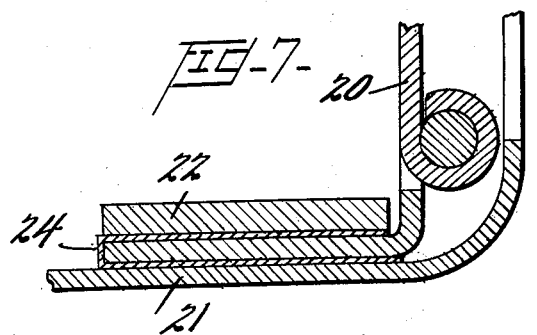
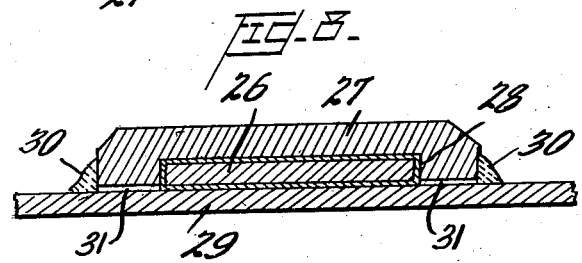
INVENTOR
Alexander G. Hyland,
BY C. B. Hamilton.
ATTORNEY

United States Patent Office 2,764,267
Patented Sept. 25, 1956

2,764,267

ASSEMBLY OF DISSIMILAR METALS AND METHOD OF MANUFACTURE

Alexander George Hyland, Winston-Salem, N. C., assignor to Western Electric Company, Incorporated, New York, N. Y., a corporation of New York Application August 30, 1952, Serial No. 307,194

8 Claims. (Cl. 189—36)

This invention relates to assemblies of dissimilar materials and more particularly to the attaching or fastening of dissimilar metals to strengthen the assembly of metallic parts.

In the fabrication of articles from sheet metals such as aluminum and magnesium, it is difficult to attach satisfactorily steel hinges and brackets to such light metal sheets with sufficient strength to withstand stress and strain in use. Several rather unsatisfactory methods of assembly are now practiced, such as the use of rivets, screws, and bolts. When the structural members are attached by rivets made of the lighter metal, the strength of the attachment is dependent upon the shearing strength of the light sheet metal and of the rivets employed, and in the case of the use of screws or bolts, by the small shearing strength of the sheet metal. Also objectionable corrosion may take place between stronger steel attachments and the light metal of magnesium.

An object of the present invention is to provide an efficient method for satisfactorily attaching hinges, brackets, or reinforcing elements to light metals, such as aluminum and magnesium.

Another object is to provide an effective assembly of dissimilar materials which will withstand stress and strain.

In accordance with these and other objects, the invention consists in placing a magnesium or aluminum retaining plate over a steel hinge or steel tapping strip or any desired reinforcing material which is to be firmly secured to a sheet or panel of magnesium or aluminum, and then welding the magnesium plate to the magnesium panel, or the aluminum plate to the aluminum panel, as the case may be. The great shrinkage of the cooling magnesium or aluminum welds, which occurs because of the high coefficient of expansion of these metals, locks the steel detail or reinforcing material securely in position on the panel. The steel detail or reinforcing material is first wrapped in aluminum foil before insertion under the securing plate to prevent corrosion between the steel detail and the magnesium panel due to any electrolytic action.

Other objects and features of the invention will become apparent from the following detailed description when taken in conjunction with the accompanying drawings, in which:

Fig. 1 is a perspective view of a metal bracket or covering plate of magnesium securing a steel reinforcing or tapping bar to a sheet of magnesium, the securing bracket or retaining plate being welded to the sheet;

Fig. 2 is a longitudinal sectional view taken along line 2—2 of Fig. 1;

Fig. 3 is a cross sectional view taken along line 3—3 of Fig. 1 before the clamping or contracting action of the welds of the retaining plate or bracket on the steel bar;

Fig. 4 is a perspective view of the magnesium retaining plate or bracket used in Figs. 1–3 to clamp the steel bar to the sheet or panel;

Fig. 5 is a perspective view of the corrosion-preventing aluminum shield or wrapping about the steel bar where it is held by the retaining plate or bracket;

Fig. 6 is an end view of an assembled structure showing a steel hinge wrapped in aluminum foil where it has been secured by a magnesium retaining plate welded to a magnesium panel;

Fig. 7 is a sectional view taken along line 7—7 of Fig. 6, and

Fig. 8 is a sectional view of any material wrapped in aluminum foil and secured by either a magnesium or aluminum (or alloy of such metals) retaining bracket welded to an aluminum or magnesium panel or alloy thereof.

Referring now to the drawings, in which like reference numerals are used to indicate the same elements throughout the several views, 10 designates a sheet or panel of magnesium to which is to be secured a steel reinforcing bar or tapping strip 11. Positioned between the underside of the bar 11 and the top of the panel 10 is an insert of aluminum 12 to prevent corrosion between the magnesium panel and the steel bar. Straddling and fitting into a rectangular slot 13 in the middle of the steel bar 11 is an inverted U-shaped retaining plate or bracket 15 made of magnesium which has a rectangular opening 16, into which is fitted a corrosion-preventing aluminum shield or wrapping 17. The combined shield 17 and retaining plate 15 are then placed in straddling position in the rectangular slot 13 as shown in Fig. 1. A clearance of approximately 1/32 of an inch is provided between the retaining plate 15 and the panel 10 as shown as 31 in Fig. 3 to allow for contraction of the welds 18 to draw these parts together, thus clamping the tapping strip 11 in place. Magnesium welds 18 are then applied along the ends of the retaining plate 15 to firmly secure it to the magnesium panel 10.

The welding operation increases the temperature of the magnesium welding material and on subsequent cooling this weld contracts and causes the bracket or retaining plate 15 to seize the steel bar 11 to hold it securely in position on the magnesium panel 10. The coefficient of expansion and contraction of the magnesium welds causes the retaining plate or bracket 15 of magnesium to be drawn against and firmly grip the steel bar 11.

In Figs. 6 and 7, a steel hinge 20 is secured to a magnesium panel 21 by an inverted U-shaped retaining bracket or plate 22 made of magnesium. This plate 22 has a rectangular opening 23 the sides of which are 1/32 of an inch shorter than the steel hinge 20 which is wrapped in a corrosion-preventing wrapper 24 made of aluminum sheet or foil. The magnesium retaining plate or bracket 22 is placed over the wrapped end of the steel hinge 20 as shown in Figs. 6 and 7 and welds of magnesium 25 are placed along the ends of the retaining plate 22 to firmly attach it to the magnesium panel 21. After the welding, the magnesium retaining plate 22 is drawn against the hinge by the contracting weld during the cooling operation to seize and firmly hold the steel hinge 20 in position on the magnesium panel 21 as shown in Fig. 6. It should be noted that if an aluminum panel, an aluminum retaining bracket and aluminum welds are employed there is no need for the use of a corrosion-preventing wrapper 24 since there would be no objectionable corrosion between the aluminum and the steel hinge 20.

Fig. 8 discloses another embodiment of the invention in which any reinforcing material 26 may be wrapped in aluminum foil or any alloy thereof to prevent corrosion between such materials and its retaining plate 27 which may be made of either aluminum or magnesium or any alloy thereof. Here again the wrapped reinforcing material 26 is placed within a rectangular slot 28 of the retaining plate 27 which is secured to a magnesium or aluminum panel 29 or an alloy thereof by means of welds 30 of the same material as that of the retaining plate 27 and panel 29. On cooling of the welds 30, the retaining plate 27 is drawn against and seizes the reinforcing material 26 to rigidly hold it in position on the panel 29.

It is to be understood that the above described assemblies and methods are simply illustrative of the principles of the invention, and many other modifications may be made without departing from the invention.

What is claimed is:

1. The method of assembling dissimilar metals which includes placing a steel member on a magnesium sheet to which it is to be secured, straddling the steel member with a magnesium retaining plate, welding the magnesium retaining plate to the magnesium sheet, and cooling the welds after welding to contract them to cause said retaining plate to seize and hold the steel member against said magnesium sheet.

2. A reinforced assembly of dissimilar metals comprising a magnesium sheet, a steel reinforcing member for said magnesium sheet on said sheet, a magnesium plate straddling said steel member, and magnesium welds securing said plate to said sheet whereby said steel member is held in compression between said plate and said sheet resulting solely from the cooling shrinkage of said welds and said member is securely held to said sheet.

3. A reinforced assembly of dissimilar metals comprising a magnesium sheet, a steel reinforcing member for said magnesium sheet on said sheet, a magnesium plate straddling said steel member, an aluminum wrapper on said steel member for preventing it from engaging said magnesium sheet and said magnesium plate to thereby overcome corrosion, and magnesium welds securing said plate to said sheet whereby said steel member is held in compression between said plate and said sheet resulting solely from the cooling shrinkage of said welds and said member is securely held to said sheet.

4. A reinforced assembly of dissimilar metals comprising an aluminum sheet, a steel reinforcing member for said aluminum sheet on said sheet, an aluminum plate straddling said steel member, and aluminum welds securing said plate to said sheet whereby said steel member is held in compression between said plate and said sheet resulting solely from the cooling shrinkage of said welds and said member is securely held to said sheet.

5. An assembly which comprises a member made of metal having as its principal constituent metal selected from the group consisting of aluminum and magnesium, a second member made of ferrous metal on said first member, a plate made of metal of the same nature as said first member straddling said ferrous member, and welds of metal of the same nature as said first member securing said plate to said first member, whereby said ferrous member is held in compression between said plate and said first member resulting from the cooling shrinkage of said welds and said ferrous member is securely held to said first member.

6. The method of making an assembly comprising placing a member made of ferrous metal on a second member made of metal having as its principal constituent metal selected from the group consisting of aluminum and magnesium, placing a plate made of metal of the same nature as said second member astraddle said ferrous member, welding said plate to said second member, and cooling the resulting welds to contract them to cause said plate to seize and hold said ferrous member against said second member.

7. The method of making an assembly comprising placing a member made of ferrous metal on a second member made of metal having as its principal constituent aluminum, placing a plate made of metal of the same nature as said second member astraddle said ferrous member, welding said plate to said second member, and cooling the resulting welds to contract them to cause said plate to seize and hold said ferrous member against said second member.

8. The method of making an assembly comprising placing an aluminum corrosive protective covering about a member made of ferrous metal, placing the corrosive protective covered member on a second member made of metal having as its principal constituent magnesium, placing a plate made of metal of the same nature as said second member astraddle said corrosive protective covered member, welding said plate to said second member, and cooling the resulting welds to contract them and cause said plate to seize and hold said ferrous member against said second member.

References Cited in the file of this patent

UNITED STATES PATENTS

| Number | Name | Date |
|---|---|---|
| 793,307 | Lachman | June 27, 1905 |
| 1,370,288 | Cole | Mar. 1, 1921 |
| 1,616,915 | Meikle | Feb. 8, 1927 |
| 1,801,235 | Hill | Apr. 14, 1931 |
| 1,996,490 | Romanoff | Apr. 2, 1935 |
| 2,185,916 | Groetschel | Jan. 2, 1940 |
| 2,188,445 | Van Rensselear | Jan. 30, 1940 |
| 2,319,455 | Hardman | May 18, 1943 |
| 2,478,478 | Grebe | Aug. 9, 1949 |
| 2,509,021 | Settle | May 23, 1950 |
| 2,684,170 | Schmitz | July 20, 1954 |